Oct. 19, 1926.
S. MATSUMOTO
1,604,059
METALLIC LINK BELT
Filed Feb. 11, 1924
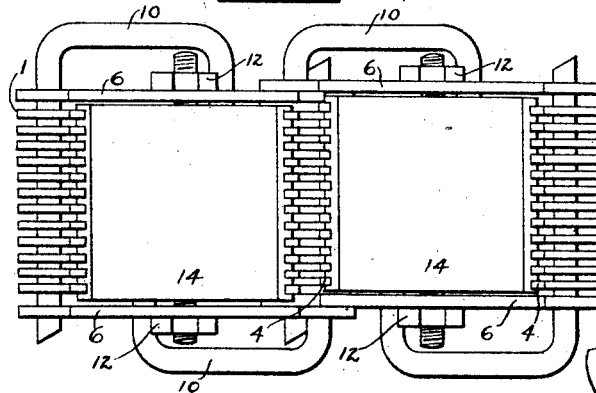
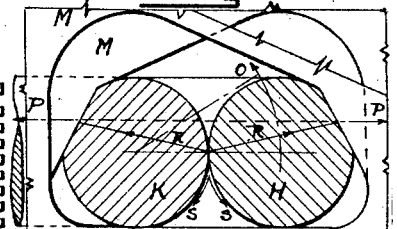
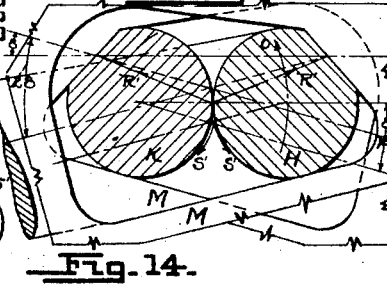
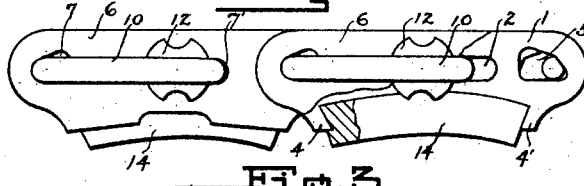
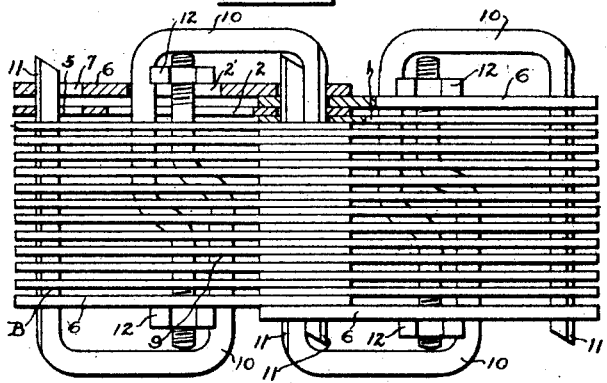
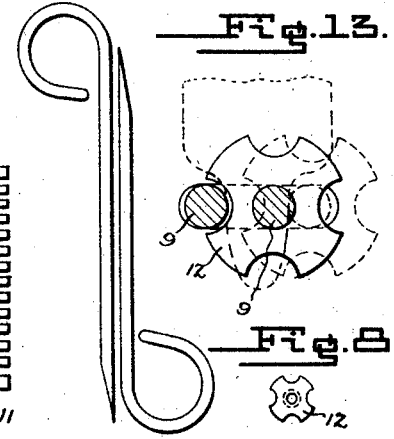
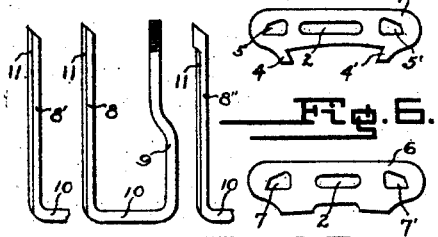
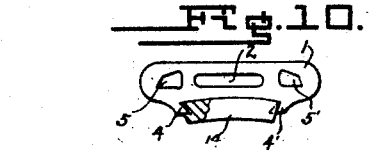
Inventor
Shigeru Matsumoto
By Lancaster and Allwine
Attorneys Patented Oct. 19, 1926.

1,604,059

UNITED STATES PATENT OFFICE.

SHIGERU MATSUMOTO, OF OSAKA, JAPAN.

METALLIC LINK BELT.

Application filed February 11, 1924, Serial No. 692,097, and in Japan February 12, 1923.

This invention embodies certain features of novelty over those disclosed in Patent 1,427,008, granted to me Aug. 22, 1922.

The primary object of this invention is to provide a metallic link belt structure embodying novel features whereby the links of the belt may be connected together in a manner so as to provide a rocking action at the pivotal connection of the links.

A further object is the provision of a link belt in which each of the links is composed of a series of members connected together with the members of the adjacent link in such manner that the width of the belt may be varied as desired by the omission or addition of the link members so as to adapt the belt to pulleys of varying widths.

Still further objects of the invention are to provide metallic link belt structures equipped with a series of pulley engaging friction pads designed to prevent the belt from slipping from the surfaces of pulleys over which the belt is arranged, and embodying features whereby the friction pads may be readily removed in the event that repair or replacement of the block becomes necessary.

Other objects and advantages of the invention will be apparent during the course of the following detailed description, taken in connection with the accompanying drawing forming a part of this specification, and in which drawing, Figure 1 is a fragmentary plan view of the inner or working face of the improved pulley, or that face which is adapted for contact with the pulley.

Figure 2 is an edge elevation of a portion of the belt, certain of the parts being broken away to disclose details of construction.

Figure 3 is a fragmentary plan view of the outer face of the belt, and showing certain parts broken away.

Figures 4^A and 4^B are enlarged diagrammatic views showing the action of the connecting pins when the belt is in a straight and arcuated condition respectively.

Figures 5 and 6 are side elevations of the intermediate and outer link members respectively, composing each link of the belt.

Figure 7 is a side elevation of one of the rockers or connecting members for joining the adjacent ends of link members of contiguous links, and showing slightly modified forms of pivot arms therefor.

Figure 8 is a plan view of a nut for application to one end of the connecting members for maintaining the link members in assembled relation.

Figure 9 is a plan view of one of the friction pads.

Figure 10 is a detail view showing the manner in which the friction pads are held by the intermediate link members.

Figure 11 is a side elevation of a tool which may be employed for applying the retaining nut to the threaded arm of the connecting members.

Figure 12 is a side elevation of a tool which may be employed for disengaging the retaining nut from the arm of an adjacent connecting member.

Figure 13 shows the use of the tool illustrated in Figure 12.

Figure 14 shows pin shaped tools for driving the connecting members into the links.

Referring to the drawing in detail, and wherein similar reference characters designate corresponding parts throughout the several views, each link of the chain is composed of a plurality of uniformly spaced intermediate link members 1, the number of which may be varied according to the width of the belt it is desired to employ. The intermediate link members 1 which are preferably punched from sheet metal, are elongated in form, and each is provided with a longitudinal slot 2 for receiving the threaded arms 9 of the connecting members 10 to be hereinafter more fully described. One edge of each intermediate link member 1 is provided with lateral projections or gripping fingers 4 and 4', the inner faces of which are disposed in outwardly converging relation thereto to engage and prevent displacement of a friction pad 14, the side edges of which are beveled according to the angular position of the projections 4 and 4' whereby to prevent lateral displacement of the pad from the link. These link members 1 are also provided with terminal openings 5 and 5' which are of special configuration, and which are adapted to receive two of the pivot arms 8 of adjacent connecting members 10.

The side link members 6 which are also provided with terminal openings 7 and 7' which align with the terminal openings 5 and 5' when the side members are in assembled relation to the intermediate link members 1, are so arranged that they will abut opposite side faces of the pad 14 and thereby prevent longitudinal displacement of the pad from the link. The side members 6 are also provided with a longitudinal slot which is preferably slightly shorter than the slot provided in the intermediate link members.

The connecting members 10 which are substantially U-shaped, each have one arm 8 thereof formed with a longitudinally extending flat surface 11 for contacting engagement with a flat surface provided in the terminally disposed openings in the link members, and have the opposite arm 9, which is provided with screw threads at its free end, formed with an offset disposed substantially midway of the length of the arm.

Subsequent to the assembling of the required number of link members 1 and side members 6 and the insertion of the friction block 14, the adjacent ends of groups of spaced intermediate link members and side link members are interfitted in the usual manner so that the slots and terminal openings of the link members are disposed in substantial alignment. The connecting members 10 may then be inserted first from one side of the belt and then from the other, with the straight or pivot arms 8 extending in contacting relation through the terminally disposed openings of the link members, and with the threaded arms of the connecting members extending through the longitudinal slots of the link members in overlying relation with the threaded end portions thereof lying outwardly of the side link members 6.

Retaining nuts 12 having recesses provided in the peripheral faces thereof, are adapted to be threaded upon the ends of the arms 9 and turned down into engagement with the side plates 6 for preventing displacement of the pads 14. Owing to the inward spring action of the arms 9, the nuts 12 will be held in engagement with the arm 9 of the adjacent connecting member in a manner so as to prevent radial movement of the nut and its subsequent displacement and loss.

It will be observed from Figures 4$^A$ and 4$^B$, that when the belt is flexed, a rolling action will take place at the contacting round faces of the bearing arms, thereby greatly reducing friction at the pivotal connecting of the links of the belt.

It will also be observed that the free ends of the arms of the connecting members 10 will lie inwardly of the portion connecting the arms together, thereby protecting the free ends of the arms and presenting a neat and finished appearance to the belt.

Various changes in the shape, size, and arrangement of parts may be made to the form of invention herein shown and described, without departing from the spirit of the invention or the scope of the following claims.

I claim:

1. A belt composed of a plurality of links, each link comprising a plurality of link members arranged side by side, and each link being provided with terminally disposed openings and an intermediate longitudinal slot, means for connecting the adjacent ends of the groups of link members, comprising U-shaped members each formed with one straight arm adapted to extend through the terminally aligned openings of the link members in contacting relation with the straight arm of the adjacent connecting member, and an arm provided with an intermediately disposed offset, adapted to extend through the aligned longitudinal slot in close proximity to an adjacent connecting member, and means for preventing displacement of the connecting members.

2. A belt composed of a plurality of links, each link comprising a plurality of link members arranged side by side, and each link being provided with terminally disposed openings and an intermediate longitudinal slot, means for connecting the adjacent ends of the groups of link members, comprising U-shaped members adapted to be disposed with an arm thereof extending through the terminally disposed openings of the link members in contacting relation with one arm of an adjacent connecting member, and having its opposite arm, extending through the longitudinal slot in close proximity to an opposite adjacent connecting member, provided with a threaded end portion projecting outwardly from the side of the link, and a nut threaded upon the end of said second mentioned arm adapted to yieldably engage the arm of the adjacent connecting member in a manner to prevent radial movement of the nut.

3. A belt composed of a plurality of interfitting links, each link being provided with terminally disposed openings and an intermediate opening, U-shaped connecting members alternately disposed at opposite sides of the belt with one of the arms thereof extending through the aligned terminal openings of adjacent link members in contacting rolling engagement with one arm of an adjacent connecting member, and having its opposite arm extending through one of the intermediate openings, and a nut threaded upon the projecting end of each of the last mentioned arms in a manner to prevent radial movement of the nuts and displacement of the connecting members.

SHIGERU MATSUMOTO.